April 11, 1939.  W. R. TALIAFERRO  2,154,292
IGNITION ELECTRODE
Filed Dec. 30, 1937
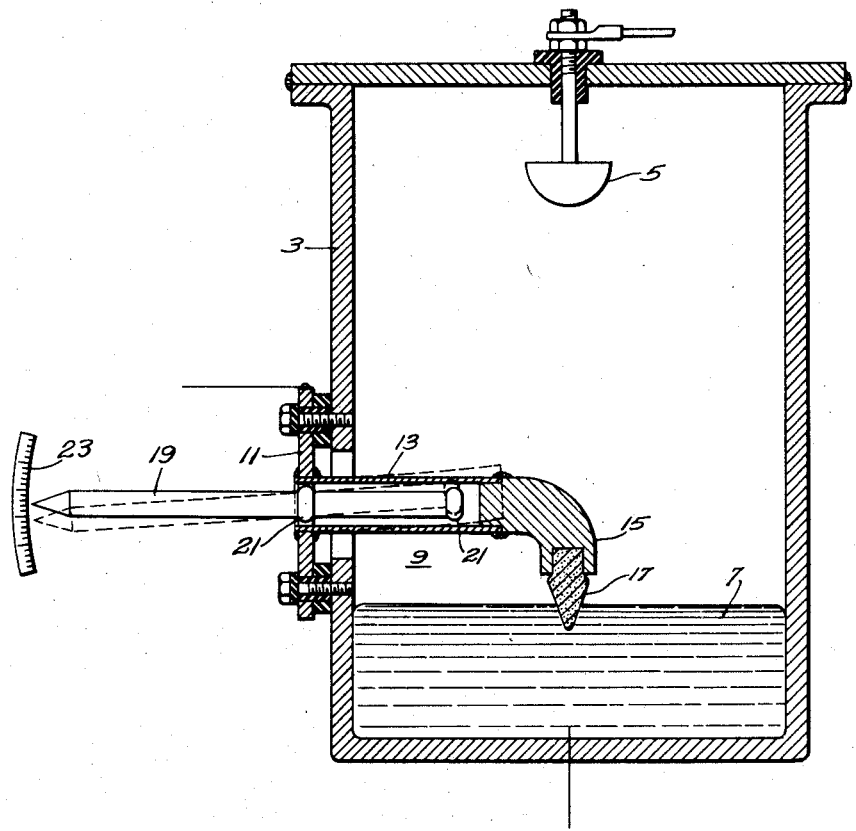
WITNESSES:
INVENTOR
William R. Taliaferro.
BY
ATTORNEY Patented Apr. 11, 1939

2,154,292

UNITED STATES PATENT OFFICE 2,154,292

IGNITION ELECTRODE

William R. Taliaferro, Pittsburgh, Pa., assignor to Westinghouse Electric & Manufacturing Company, East Pittsburgh, Pa., a corporation of Pennsylvania Application December 30, 1937, Serial No. 182,523

9 Claims. (Cl. 250—27.5)

My invention relates to vapor discharge devices and more particularly to new and useful improvements in the adjustment of make-alive electrodes of such devices.

In the operation of vapor discharge devices of the type provided with make-alive electrodes partially immersed in the cathode of such devices, it was discovered that the make-alive electrodes frequently got out of alignment, or after having been used for any length of time, the tips of such electrodes wore away, losing contact with the mercury cathode. During assembly of such devices, frequent cases arise where the make-alive electrodes are not in correct alignment. No accurate method is known in the assembly of such devices to check possibilities of incorrect alignment. It then becomes necessary to open the tank to atmosphere and adjust the position of such exciting electrodes with respect to the mercury cathode. Such a procedure is costly and service is interrupted for long periods of time. In addition, such a procedure involves the risk of leaks after reassembly and requires that the tank be again evacuated.

I provide a system of adjustment of the make-alive electrodes enclosed within the tank without removing the tank lid or exposing the tank to atmosphere which is quick and reliable. Briefly, I provide an electrode adjuster enclosed within the evacuated tank, but which is actuated by some suitable means external to the tank proper. The exciting electrode can thus be raised or lowered or centered properly, and if a scale or gauge is used, the actual change can be measured.

It is, therefore, an object of my invention to provide means for adjusting make-alive electrodes of vapor discharge devices without disturbing the vacuum therein.

It is another object of my invention to provide an electrode adjuster, the change in the position of which can be actually measured.

Still further, it is an object of my invention to provide an electrode adjuster contained within an evacuated vessel, the movements of which can be actuated by some suitable external means.

Other objects and advantages of my invention will be apparent from the following detailed description taken in conjunction with the accompanying drawing, in which the single figure is a view partly in section of the mechanical arrangement of an electrode adjuster according to my invention.

The apparatus according to my invention comprises an evacuated tank 3, an anode 5, a liquid metal cathode 7, preferably mercury, in the base of the tank 3, and a make-alive electrode 9 partially immersed in the liquid cathode 7. The side wall of the tank 3 has an aperture which is covered by a plate 11 insulated from the tank 3. This removable plate 11 has a central opening for extending into the tank 3, a cylindrical tube 13, preferably of soft steel, to which the exciting electrode holder 15 is mechanically secured. A gas-tight weld is made at the point connecting the electrode holder 15, as well as at the other end of the tube 13, where it fits into the insulated plate 11. Preferably, I desire to extend the cylindrical tube 13 into the tank 3 such a distance that the combined length of the tube 13 and the electrode holder 15 will place the tip of the make-alive electrode 17 in the center of the liquid cathode 7.

A removable rod 19, preferably of hard steel, and having a shouldered knob 21 at its terminal as well as at the point where it rests against the plate 11, is inserted into the cylindrical tube 13. Normally this rod 19 is not used except when it is desired to make an adjustment of the exciting electrode 17.

In the operation of my device, assume that the electrode 17 lost contact with the mercury cathode 7, the rod 19 is inserted into the cylindrical tube 13 so that the shouldered knob 21 at the terminal of the rod 19 is free to move about the inner circumference of the cylindrical tube 13 and the second shouldered knob 21 rests against the removable plate 11. Such an arrangement of the removable rod 19, cylindrical tube 13 and the removable plate 11 is an illustration of the application of a first-class lever where the fulcrum is at the plate 11, the effort is applied at the handle of the removable rod 19, and the resistance to be overcome is the soft steel tube 13. By raising the hard steel rod 19 a little, the knob 21 at the terminal of the rod 19 causes the soft steel tube 13 to bend with corresponding movements of the holder 15 of the make-alive electrode 17. It can be readily understood that the exciting electrode 17 can be shifted horizontally as well as vertically.

By providing a suitable gauge 23 or a scale and mounting it near the outside terminal of the removable rod 19, actual movements of the make-alive electrode 17 can be measured. I have indicated by dotted lines the position of the removable rod 19 and the soft steel tube 13 when a downward pressure is applied to the removable rod 19.

While I have shown and described certain specific embodiments of my invention, it will be apparent that changes and modifications can be made therein without departing from the true spirit of my invention or the scope of the appended claims.

I claim as my invention:

1. In a pool-type discharge device comprising a plurality of main electrodes and a make-alive electrode in permanent contact with one of said main electrodes, means associated with said make-alive electrode for adjusting the degree of contact of said make-alive electrode with one of said main electrodes, and means outside said device for actuating said adjusting means.

2. In a pool-type discharge device comprising a plurality of main electrodes one of which is electron emitting and a make-live electrode in permanent contact with said electron emitting electrode, a bendable mounting means within said device, said make-alive electrode fastened to said bendable means, and means external to said device for actuating said bendable mounting means.

3. In a vapor discharge device comprising an evacuated container, an anode, a liquid metal cathode and an exciting electrode in contact with said cathode, means for adjusting the depth of said exciting electrode in said cathode, said means including a pliable cylindrical tube secured to the interior wall of said container, means for fastening said exciting electrode to said tube, and means external to said discharge device insertable in said tube for bending the same.

4. In a vacuum discharge device comprising an evacuated container, an anode, a mercury cathode and a make-alive electrode in permanent contact with said cathode, means including a flexible internal rod attached to said container, said make-alive electrode being fastened to the non-attached side of said flexible rod, and external means for actuating said internal rod without disturbing the vacuum of said device.

5. In a vapor discharge device, an anode, a mercury cathode, a make-alive electrode in contact with said cathode, pliable means within said device, said make-alive electrode attached to said pliable means, and means external to said device for bending said pliable means.

6. In a vapor discharge device, a mercury cathode, a make-alive electrode in permanent contact with said cathode, means for adjusting the depth of said make-alive electrode in said cathode, said adjusting means having an end portion secured to said make-alive electrode, means external to said device for actuating said adjusting means, and a second means external to said device for indicating the position of said make-alive electrode.

7. In a vapor discharge device comprising an anode, a mercury cathode and a make-alive electrode permanently in contact with said cathode, bendable means within said device, said make-alive electrode mounted on said bendable means, means external to said device for bending said bendable means, said external means operating essentially as a first-class lever.

8. An electric discharge device comprising an evacuated metal tank an anode and containing a make-alive electrode in contact with a mercury cathode in a portion of said tank, a holder for said make-alive electrode, means for supporting said holder within said tank, said means including a pliable metallic cylinder one end of which surrounds a portion of said holder and is sealed thereto, an aperture in the side wall of said tank, a closure plate covering said aperture, an insulating material filling the space between said plate and said tank, an aperture in said closure plate, the other end of said pliable cylinder fitted into the aperture of said closure plate and sealed thereto, and external means for bending said pliable cylinder to change the position of said make-alive electrode without disturbing the vacuum therein.

9. In combination with a vapor electric discharge device comprising an evacuated container, an anode, a liquid cathode and a make-alive electrode in contact with said cathode, apparatus comprising means for adjusting the position of said make-alive electrode in said container, said adjusting means including a bendable cylindrical container projecting into said evacuated container, means for securing said make-alive electrode on said cylindrical container and external means for actuating said cylindrical container.

WILLIAM R. TALIAFERRO.